May 6, 1930.  H. H. ALEXANDER  1,756,967
METALLURGY OF METALS
Filed July 21, 1926

TO FURNACE

INVENTOR
Harry H. Alexander
BY
Pennie, Davis, Marvin & Edmonds
ATTORNEYS

Patented May 6, 1930

1,756,967

UNITED STATES PATENT OFFICE

HARRY H. ALEXANDER, OF WESTFIELD, NEW JERSEY

METALLURGY OF METALS

Application filed July 21, 1926. Serial No. 123,886.

This invention relates to the metallurgy of copper, and has for its object the provision of an improved method for melting and refining impure copper.

In the melting and refining of copper, as heretofore more generally practiced, (1) anode copper is recovered from copper-bearing material; (2) it is subjected to electrolysis by which a more pure cathode copper is produced; (3) batches of anodes and cathodes are separately charged into reverberatory furnaces for a 24 hour melting operation; (4) the molten material is subjected to ($a$) an oxidizing blast of air, or ($b$) flapping with a rabble, to oxidize the impurities which are volatilized or which pass into a slag; (5) the slag containing the impurities is skimmed from the metal; (6) the excess of oxygen is removed from the copper by poling; (7) a protecting cover of charcoal or coke is placed on the metal bath to prevent oxidation or contamination of the copper; (8) after which the copper is cast into molds.

This former practice has a number of undesirable features. In heating the copper as just outlined, the top layer of the charge in the reverberatory furnace melts first. The molten copper trickles down on the comparatively cold material below and tends to solidify, until the charge has flattened out. Further melting of the charge can then be obtained only by transmission of heat through the molten metal on the surface of the flattened charge. In the meantime much non-utilized heat has escaped from the furnace.

Melting in this manner, moreover, removes practically none of the impurities contained in the charge. In fact they may be increased, as when the copper takes up sulfur from the furnace fuel and when impurities (such as sulfur, arsenic, antimony, lead, etc.) already present as oxides are reduced to the metallic state.

As observed above, the molten material from the reverberatory furnace is generally subjected to a separate oxidizing step to oxidize the impurities by the injection therein of a blast of air. This strong oxidizing blast of air splashes the molten material on the roof and side walls of the furnace, to their quicker deterioration and destruction. Obviously much of the molten copper will at the same time be converted to copper oxide. Since an excess of air is required in the attempt to reach, touch and thus oxidize the impurities, a considerable portion of the copper will be oxidized. This is undesirable because it means that a very large amount of reducing agent must subsequently be employed to reduce the copper oxide to copper. Moreover, not all of the impurities will be oxidized and the final product therefore remains contaminated. It is thus seen that this separately conducted oxidizing operation is not only costly, but has numerous other disadvantages at best.

The prior practice has been to de-oxidize the oxidized material by means of poling—i. e., by submerging green wooden poles in the bath of metal. The poles are largely converted into charcoal and steam by the heated bath. This operation takes from 2 to 4 hours, and 100 to 150 pounds of wood, per ton of copper treated. The poles used are 5 to 12 inches in diameter and 15 to 25 feet in length. They should be comparatively straight, hard wood, and must be used green. Such choice young timber is becoming scarce around smelters and refineries, and is rapidly advancing in price. Even after the most successful poling operation it will generally be found that about 0.40% copper oxide remains un-converted to copper. In addition to this incomplete reduction of the copper, it is to be noted that during the decomposition of the poles a certain amount of hydrocarbons pass from the poles into the molten metal. An undesirable spongy copper thus often results.

The de-oxidized copper bath is covered with a protecting layer of charcoal or coke during the casting operation to prevent both oxidization and contamination from the impurities in the heat supplying fuel. It is extremely difficult, in fact well nigh impossible, to spread the layer of charcoal or coke to a uniform depth over the entire surface of the bath of metal. Even if it were so spread, the charcoal is nevertheless frequently consumed in spots which leaves the copper exposed. Exposed molten copper promptly picks up oxygen and impurities. This has been such an acute problem that it is very rare to get a final copper product of uniform good quality. The last portion of the cast must frequently be reworked to bring it up to standard.

The molds in which the molten copper is cast usually stand in the open atmosphere, some of the copper is therefore oxidized. This usually varies from 0.09 to 0.15%.

It is thus seen that even under the most favorable circumstances, copper produced by the usual method tends to result in a final product which is sufficiently impure to make it undesirable for many uses.

The present invention eliminates to a very large extent the disadvantages of the more common practice above described, and a method is provided for economically securing a practically pure metal.

According to my invention a method is provided for the melting and refining of impure copper by which, in brief, a charge of the copper is subjected to melting gases of regulated composition, while molten material is continuously drained from the charge. Finely divided reducing agent is introduced into the body of molten material, preferably by the use of an appropriate gas, such as steam, under pressure. A molten protecting cover is maintained over the bath of metal during the casting operation which is conducted in an inert or non-oxidizing atmosphere.

A reverberatory furnace with a sloping hearth may first be used to advantage in the practice of my invention. A charge of copper, which may be crude copper or partially refined copper, or a mixture of the same, is piled on the sloping hearth. Heating gases of regulated composition (oxidizing, neutral or reducing) are passed into the furnace.

The chemical reacting quality of the gas is made to depend upon the nature of the impurities in the charge. If it is desired to oxidize the impurities, as is frequently the case, oxidizing gases are passed into the furnace. If the charge, for example, is already present in an oxidized state and it is desired to first reduce it in the treatment process, reducing gases are employed. On the other hand, if the furnace charge is such that it is advisable to keep it out of contact with either oxidizing or reducing gases, neutral gas is used.

The control of the degree and the reactive quality of the gases may be maintained by varying the proportion of air and fuel supplied to the furnace. To provide a neutral atmosphere just sufficient air is mixed with the fuel (such as coal, oil and gas) to oxidize the same. To produce an oxidizing atmosphere an amount of air in excess of that required to complete combustion of the fuel is used. In a similar manner, to secure a reducing atmosphere an amount of air insufficient to complete combustion of the fuel is employed.

The outer surface of the furnace charge will naturally be most directly exposed to the heating gases. As fast as the metallic values melt they are drained down the sloping hearth and away from the charge. New and fresh surfaces of the charge are then exposed to the heating gases. If it is desired to oxidize the impurities, oxidizing gases are supplied to the furnace during the melting operation. As the molten material trickles down the sides of the charge and the sloping hearth, the impurities (such as sulfur, arsenic, antimony, lead, etc.) are exposed to the oxygen in the gases and thus become oxidized, while a relatively small amount of the copper is oxidized. In this way the prior practice of oxidizing the impurities by forcing a blast of air through the body of molten material is avoided. The furnace walls are consequently not ruined by being subjected to splashing with molten material and slag.

The slag containing the unvolatilized impurities is skimmed from the bath, and the molten material is preferably removed to a second furnace, as by ladles, in which the refining operation of de-oxidizing is conducted. Various finely divided reducing materials (such as pulverized carbonaceous materials, charcoal, coke, etc.) may be employed for this purpose. Means are provided for injecting the reducing agent into the body of molten metal. In the case of a large body of metal it is best to inject the reducing agent at a plurality of points. The reducing agent may be injected in any appropriate manner, such as by screw conveyors, under pressure, with or without the aid of a gas, etc.

In the present practice of my invention, I inject the finely divided reducing material into the body of the metal bath by means of superheated steam under presure, although it is to be understood that any other appropriate gas may be employed. Steam under pressure has a number of very desirable advantages. It not only acts as an efficient carrier of the reducing agent to the body of molten material, but it serves to drive residual sulfur and its compounds, as well as other impurities, from the metal bath. Steam is decomposed by certain impurities, such as zinc, which is oxidized and can be removed as such. It also catches and removes gases from the bath. While steam yields the same action with the metal bath as does green wood in a poling operation, it has not the same disadvantages. The steam together with its closely associated particles of reducing agent can be widely dispersed throughout the metal bath and thus be brought into intimate contact with the minute particles of metal oxides present in the bath. This means that very much less reducing agent is required as compared with the old practice. The time, moreover, required for the de-oxidizing operation is materially shortened. A very thorough de-oxidization results.

Directly after the de-oxidizing operation, a molten protecting cover is placed on the copper bath. This is done to prevent oxidation of the copper and to keep outside impurities from contaminating the same. The fluid molten cover may advantageously consist of an appropriate glass or slag which should melt at a temperature not higher, and preferably lower than the copper, and which should not attack the furnace linings. Soda glasses fulfill the requirements, such as $Na_2O.SiO_2$, $Na_2O.2SiO_2$, and $Na_2O.3SiO_2$ which melt at about 1088°, 870°, and 790° C., respectively.

A mixture of these soda glasses may be made to secure a cover which will melt at an appropriate temperature. Calcium oxide (CaO) or calcium fluoride ($CaF_2$) may also be added to these glasses in order to get the same results. Since the glasses range from basic to acid, a protecting cover suitable for any kind of furnace lining is available. These soda glasses are not only comparatively cheap, but the glass can be regenerated for reuse with little difficulty. Moreover, a fluid cover is provided which will maintain a uniform layer over the whole metal bath. It acts as a very efficient protecting cover. The molten copper is then in condition to be poured into molds under uniform quality.

In order to prevent oxidation of the molten copper during the pouring of the same into the molds, I conduct the molding operation in a non-oxidizing or inert atmosphere.

If metals are melted and refined in accordance with this invention, it is thus seen that a practically pure product is obtained in an efficient and economical manner.

My invention will be more clearly understood by reference to the accompanying drawings, taken in conjunction with the following description, in which.

Figure 1:
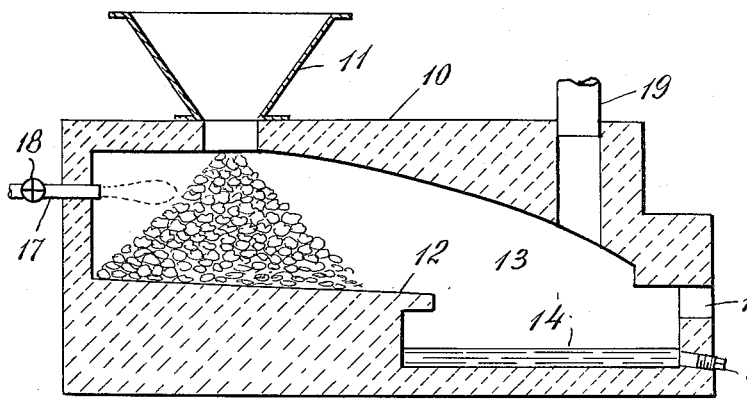
Fig. 1 is a sectional side elevation of a melting furnace.
Figure 1:
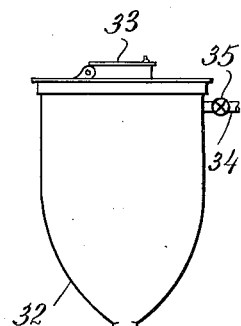
Figure 3:
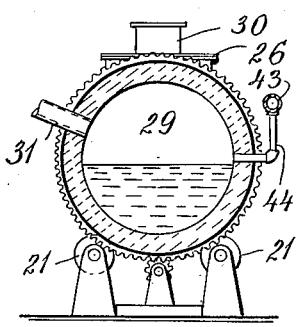
Fig. 3 is a sectional end elevation on the line 3—3 of Fig. 2.
Figure 2:
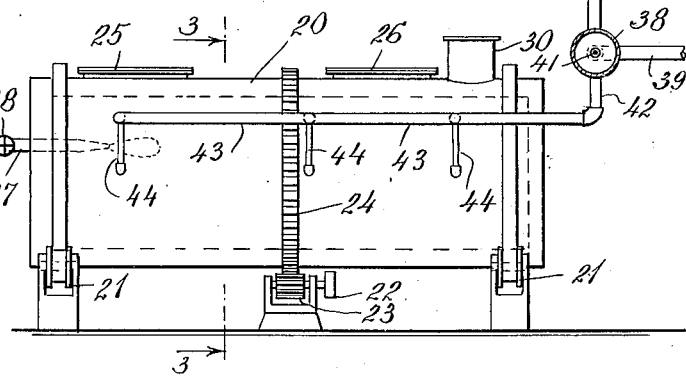
Fig. 2 is an elevation of a refining furnace.
Figure 4:
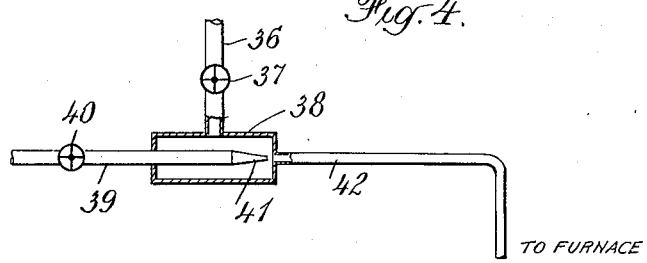
Fig. 4 is a detail, part end elevational and sectional, of the injector shown in Fig. 2.

The reverberatory melting furnace 10 is provided with a hopper 11 for depositing a charge of impure copper onto the sloping hearth 12. The furnace chamber 13 has a well or reservoir 14 to collect the molten copper which trickles down the sloping hearth 12. A plug 15 fits into the bottom of the well and can be removed whenever it is desired to withdraw copper. An opening 16 is provided above the well for the removal of slag floating upon the copper bath. This opening is suitably closed until slag is to be removed.

A burner, or burners, 17 fits into one end of the furnace and protrudes into the chamber 13. This burner is designed to supply combustible, or heat supplying, fuel and air in appropriate amounts to the furnace. A valve 18 allows a control of the amount of fuel and air supplied to the furnace. The stack 19 is located at the other end of the furnace for the withdrawal of gases from the chamber 13.

The refining furnace 20 is also of the reverberatory type, and is designed to rotate on the wheel supports 21. The motive power is supplied through the shaft wheel 22 turned by a motor (not shown). The pinion 23 is attached to the shaft of the wheel 22 and meshes with the gear 24 surrounding the body of the furnace 20. Removable lids 25 and 26 are located at the top of this furnace. A burner 27, with a control valve 28, is located in one end of the furnace and is adapted to supply a combustible, or heat supplying, fuel to the chamber 29 within the furnace. The other end of the furnace has a stack 30 for withdrawing gases and products of combustion. A drain 31 fits into the side of the barrel-like furnace for withdrawing molten metal.

An egg-like container 32 is placed above the furnace 20 and is adapted to hold reducing agents to be supplied to the furnace. This particular shape of the container permits the contents to be forced to the bottom outlet more readily. A charging door 33 opens into the top of the container. A pipe 34 with a valve 35, leads into the container near the top, and is adapted to supply a gaseous medium under pressure into the container. An outlet pipe 36, with a valve 37, leads from the bottom of the container 32 into the injector-drum 38. This drum is connected with an injector pipe 39, having a control valve 40, adapted to inject a gaseous medium, such as steam, into the drum 38. This injector pipe has a constricted nozzle 41 which leads closely to the outlet pipe 42.

The pipe 42 is in turn connected to the header 43 which runs almost the full length of the furnace 20. This header has a plurality of feed pipe outlets 44 leading into the furnace chamber 29. The end of pipe 42 which joins the header 43 is preferably flexible so that furnace 20 may be turned without difficulty.

The operation of the above described apparatus is as follows:

Appropriate copper-bearing material is charged through the hopper 11 onto the sloping furnace hearth 12. Combustible or heat supplying, fuel is supplied to the furnace chamber 13, under regulated conditions by means of the burner 17. This combustible fuel is so controlled in chemical content that the atmosphere within the chamber 13 may be maintained at an oxidizing, a reducing, or a neutral state, as desired. As quickly as the metallic values of the furnace charge melt, the same trickles down the sides of the charge and onto the sloping hearth 12, and from thence into the receiving well or reservoir 14. Gases and products of combustion escape from the furnace chamber by way of the outlet stack 19. When the well or reservoir 14 is filled with molten copper, the slag is removed through the outlet 16.

Molten copper may be withdrawn from the reservoir by removing the plug 15. If an oxidizing atmosphere is maintained within the furnace, the impurities will be oxidized and they will either be volatilized or rise into the slag floating on the copper bath. At the same time some of the copper will be oxidized. This copper is then fed to the refining furnace 20 in any appropriate manner, such as by a ladle. The interior of the furnace is kept hot by means of the burner 27. As in the case of burner 17, the content of the combustible or heat supplying fuel may be so controlled as to regulate the reacting atmosphere within the furnace. After a sufficient quantity of molten copper has been passed into chamber 29, reducing material (such as finely divided pulverized carbonaceous material, charcoal, coke, etc.) from the container 32 is injected into the body of molten copper to de-oxidize the same. This is accomplished by supplying air under pressure through the pipe 34 into the container 32. This pressure tends to force the reducing agent down the pipe 36 into the injector-drum 38. As the reducing agent falls into the drum 38, it is met by a stream of gas, such as superheated steam, under pressure. The constricted nozzle 41 tends to make the steam shoot into the outlet pipe 42 at a great velocity. Reducing material is caught by the steam and is rapidly conveyed to the header 43, whereupon it is sub-divided and passed down through the feeders 44 into the body of molten metal maintained within the furnace 20.

During the operation of injecting the reducing agent, the refining furnace 20 is revolved to such an extent that the reducing agent may be passed into the body of metal rather than into the space above the body of metal. The combined steam and finely divided reducing agent are thoroughly distributed throughout the body of molten metal.

As soon as the reducing or de-oxidizing operation has been accomplished, a glass slag forming material is passed through the doors 25 and 26 into the chamber 29, to provide a molten protecting cover for the copper bath. It is, of course, evident that this molten protecting cover may also be placed on the metal bath before, or during, the de-oxidizing operation. Metallic oxides may be removed from the slag by replacing them with an equivalent amount of sodium oxide ($Na_2O$) or calcium oxide (CaO) and fusing; or by dissolving the water glass and evaporating the same, thus re-generating the glass for reuse. When it is desired to pass the molten metal into molds, it is only necessary to turn the furnace in the opposite direction so that the molten metal may drain through the outlet pipe 31.

The molding operation is conducted in a non-oxidizing or inert atmosphere. This can be accomplished in a variety of ways, such as by keeping the outlet pipe 31 and the molds (not shown) in a housing in which such an atmosphere may readily be maintained. Carbon dioxide gas is very suitable for this purpose, although other non-oxidizing gases would also do very well.

It is thus seen that in the practice of my invention, which is of course not to be confined to the apparatus disclosed in the accompanying drawings, it is possible to melt and refine copper in a relatively simple, economical and efficient manner, particularly when compared with the usual practice heretofore resorted to.

Moreover, the copper produced according to the practice of this invention is of a higher grade of purity than that made by the more general present practices.

I claim:

1. The method of refining a body of molten copper which comprises maintaining a molten protective cover consisting at least in part of soda glass having a melting point not higher than that of the copper over the copper bath, and introducing pulverized carbonaceous reducing material under pressure into the body of molten copper.

2. In the method of refining a body of molten copper, the step of providing and maintaining a molten protective cover consisting at least in part of soda glass having a melting point not highher than that of the copper over the copper bath.

3. The method of refining a body of molten copper which comprises introducing pulverized carbonaceous reducing material under pressure into the body of molten copper, said carbonaceous reducing material being carried into the molten copper by and in the presence of steam in appreciable amounts.

4. The method of refining a body of molten copper which comprises intimately admixing pulverized carbonaceous reducing material with steam under pressure, and conducting both the steam and carbonaceous reducing material so admixed into the body of molten copper.

5. The method of refining a body of molten copper which comprises introducing an intimate admixture of pulverized carbonaceous reducing material and steam under pressure into a body of the molten copper, said admixture of carbonaceous reducing material and steam being supplied to the body of molten copper in manner and amount adapted to be substantially evenly distributed throughout the body of molten copper so that each and every particle of impurity may be contacted therewith to effect the desired purification.

In testimony whereof I affix my signature.

HARRY H. ALEXANDER.